United States Patent [19]
Hatano et al.
[11] 3,775,601
[45] Nov. 27, 1973

[54] ARITHMETIC SYSTEM FOR USE IN ELECTRONIC CALCULATOR

[75] Inventors: Isao Hatano; Akira Nagano, both of Kyoto-fu, Japan

[73] Assignee: Omron Tateisi Electronics Co., Kyoto-fu, Japan

[22] Filed: Nov. 30, 1971

[21] Appl. No.: 203,346

[30] Foreign Application Priority Data
Nov. 30, 1970 Japan .............................. 45/106122

[52] U.S. Cl. .............................. 235/156, 235/160
[51] Int. Cl. .............................. G06f 7/38
[58] Field of Search .............................. 235/156, 159, 160, 235/164, 168

[56] References Cited
UNITED STATES PATENTS

| | | | |
|---|---|---|---|
| 3,629,564 | 12/1971 | Drage et al. | 235/160 X |
| 3,330,946 | 7/1967 | Scuitto | 235/160 |
| 3,509,329 | 4/1970 | Wang et al. | 235/156 |
| 3,586,844 | 6/1971 | Hanbicki | 235/160 X |

*Primary Examiner*—Felix D. Gruber
*Assistant Examiner*—James F. Gottman
*Attorney*—Craig, Antonelli and Hill

[57] ABSTRACT

An arithmetic system for use in an electronic calculator including an additional register for storing a constant number which is used in an arithmetic calculation such as division, subtraction, addition and multiplication with respect to a series of arbitrary numbers. The content stored in the additional register is utilized only when the constant calculation is to be performed.

13 Claims, 1 Drawing Figure

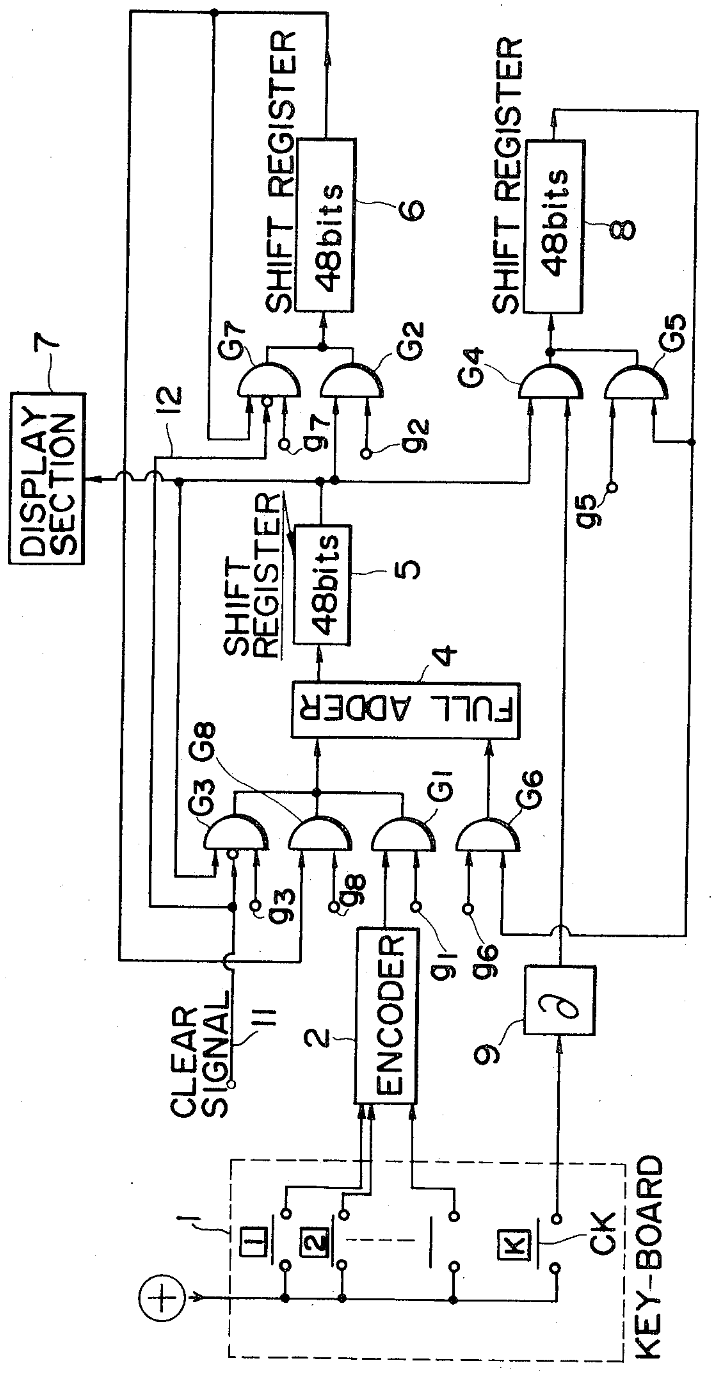
DISPLAY SECTION
7
12
SHIFT REGISTER
48bits
6
G7
G2
g7
g2
SHIFT REGISTER
48bits
8
G4
G5
g5
SHIFT REGISTER
48bits
5
FULL ADDER
4
G3
G8
G1
G6
g3
g8
g1
g6
CLEAR SIGNAL
11
ENCODER
2
9
1
1
2
K
CK
KEY-BOARD

ARITHMETIC SYSTEM FOR USE IN ELECTRONIC CALCULATOR

The present invention relates to an arithmetic system for use in an electronic desk-top calculator and, more particularly, to an arithmetic system capable of performing a series of constant calculations, namely, an arithmetic operation subjected between a constant number and a series of arbitrary numbers, in a simplified manner.

A conventional electronic calculator of this character has a disadvantage in that the operational procedure is much complicated when a series of constant calculations is to be performed.

To make this disadvantage apparent, a set of calculations will be described in conjunction with the operations of various keys on the keyboard of the conventional calculator according to the following examples:

A. $a \times (3 + 2) \times 4 = a \times 20$

B. $b \times (3 + 2) \times 4 = b \times 20$

C. $c \times (3 + 2) \times 4 = c \times 20$ wherein $a$, $b$ and $c$ are, respectively, arbitrary numbers. In an attempt to obtain the arithmetic result of each equation as above described, the constant portion $(3 + 2) \times 4$ of the equation should be processed first. However, for this process, the operator of the calculator should operate various keys as shown below and in the order as specified;

"3" figure key [3],

Addition key [+],

"2" figure key [2],

Addition key [+],

"4" figure key [4],

Multiplication key [×], and finally

Equal key [=]

For the sake of brevity, these operational procedures are represented as [3] [+] [2] [+] [4] [×] [=]

With this procedure as hereinabove outlined, an arithmetic result "20" of the constant portion of the equation can be obtained. However, in order to proceed in the calculation with the series of equations (A), (B) and (C), the operator must externally store the result "20" which has been indicated at the indicia display window of the calculator in a suitable manner such as by writing the result down on a paper or memorizing it, since the result "20" which is stored in the calculator should be cleared for subsequent calculations. After the stored data has been cleared, the following operations for the calculation between the constant number "20" and various arbitrary numbers $a$, $b$ and $c$ are required;

(A) [2] [0] [K] [×] [a] [=]

(B) [b] [=]

(C) [c] [=]

wherein K represents an auxiliary key to be operated when a series of constant calculations has to be performed.

Through these operations of the keys, the result of the series of constant calculations can be read off.

From the foregoing discussion, there are apparent disadvantages in that the time necessary for performing a series of constant calculations is lengthened and the operator of the calculator is inconvenienced at the time of operating various keys, since the operator must read out and memorize the constant number which is the result of an arithmetic operation, and the constant thus menorized by the operator must be entered in the calculator by operating the character keys representative of respective digits of the constant number.

The same disadvantages reside even in the case where addition, subtraction and division are performed between the constant number and a series of arbitrary numbers.

Accordingly, the present invention has been made for eliminating these disadvantages commonly inherent in a conventional electronic calculator or similar device and has for one of its essential objects the provision of an arithmetic system for use in an electronic calculator capable of performing a series of constant number calaculations with simplified operational procedures.

The present invention will be hereinafter fully described in conjunction with a preferred embodiment of the present invention taken only for the purpose of illustration thereof with reference to the accompanying drawing, in which The FIGURE is a schematic block diagram of a circuit arrangement of an arithmetic system embodying the present invention.

Before the description proceeds, it is to be noted that the operation of various components of the electronic calculator to which the present invention is applicable is synchronized by numerous timing signals as is well known to those skilled in the art. In other words, each binary signal can be transferred from stage to stage in response to a bit timing signal while a signal representative of one digit of a decimal number can be transferred from stage to stage in response to a digit timing signal having a duration substantially equal to four bit timing signals. However, for the sake of brevity, description in connection with the operation of these timing signals is herein omitted.

Referring now to the drawing, reference character 1 represents a keyboard of an electronic calculator including a plurality of keyboard switches operatively associated with ten keys representing zero through nine and control or function keys such as generally indicated by [×], [−], [+], [÷], and others.

The keyboard 1 shown contains a contact CK associated with the constant calculation key [K] to be operated by the operator in performing the constant calculation. The signals produced upon depression of each input key are converted into a specific binary coded decimal number by an encoder matrix 2 and, thereafter, applied to one of the input terminals of an AND gate G1. The output terminal of this gate G1 is connected with an input terminal of a full adder 4 while the output terminal of the full adder 4 is connected with an input terminal of a visual register 5 of serial shift type comprising 48 bits for storing the binary coded decimal signals.

The other input terminal of the gate G1 is adapted to receive a signal $g1$ which is to be generated during the time in which the binary signal fed from the encoder matrix 2 is to be applied to the full adder 4. Accordingly, this gate G1 can be triggered "on" during a predetermined time upon receipt of the signal $g1$, to permit the application of the binary signal from the encoder matrix 2 to the full adder 4.

The output terminal of the visual register 5 is connected through an AND gate G2 to the input terminal of a 48-bit serial shift register 6. The output terminal of the visual register 5 is connected to a display section 7 having a plurality of indicia indicating tubes (not shown), and to the input terminal of the adder 4 through a gate G3.

A timing signal $g3$ is impressed on a timing signal input terminal of the gate G3 which is triggered "on" during the receipt of the signal $g3$ to permit the circulation of the contents of the visual register 5 through the gate G3 and the full adder 4. Along therewith, the contents of the visual register 5 are supplied to the display section 7 to enable the indicating tubes to display the figures corresponding to the contents.

The output terminal of the visual register 5 is connected through a gate G4 with an input terminal of a 48-bit shift register 8 for storing the constant. To a second terminal of the gate G4 is connected the output terminal of a differential circuit 9 which transmits a signal when the constant key [K] has been depressed, as will be described later. Accordingly, the signal from the differential circuit 9 can be impressed on the gate G4 during the process of performing the constant calculation to open the gate G4, whereby the signal representative of the constant stored in the register 5 is transferred to the register 8.

The input terminal of the differential circuit 9 is connected with the contact CK of the constant calculation key [K]. The differential circuit 9 is designed so as to generate a signal having the pulse duration at least equal to one word period, namely, a period in which a 48-bit signal is transmitted, upon receipt of the step input fed from the contact CK.

One input terminal of a gate G5 is connected with an output terminal of the register 8 while the output terminal of said gate G5 is connected with the input terminal of the register 8. The gate G7 can be triggered on upon the impression of the signal $g7$ at the input terminal thereof to recirculate the contents of the register 6, while the gate G8 can be triggered on upon the impression of the signal $g8$ at the input terminal thereof to transfer the contents of the register 6 to the full adder.

The clear signal $\overline{CAS}$ fed from the clear key contact when the clear key [CA] on the keyboard has been depressed, can be impressed upon lines 11 and 12. The lines 11 and 12 are respectively connected with the inhibit input terminals of the gates G3 and G7 so that, when this signal CAS is applied to these gates G3 and G7, these gates G3 and G7 can be triggered off to permit the contents respectively stored in the registers 5 and 7 to be cleared out.

The operation of the preferred embodiment of the present invention will be hereinafter described by way of examples hereinbefore listed. Namely, A. $a \times (3 + 2) \times 4 = X$ B. $b \times (3 + 2) \times 4 = Y$ C. $c \times (3 + 2) \times 4 = Z$ At first, the key operating procedure is carried out in the order of [3] [+] [2] [+] [4] [×] [=] to obtain the result of an equation $(3 + 2) \times 4$ which acts as a constant. Such a procedure is also usually conducted in the conventional electronic calculator. Accordingly, a decimal number "20", which is the product of the above equation, is displayed on the indicia display window while this result is concurrently stored in the register 5. Then, the constant key [K] is locked in the depressed condition and a high level signal is transmitted from a contact CK to the differential circuit 9 so that the latter can generate a high level output signal only during one word period after the key [K] has been depressed. The signal from the differential circuit 9 opens the AND gate G4 to transfer the content "20" of the register 5 to the register 8. The content "20" thus transferred to the register 8 is circulated back thereto through the AND gate G5. As a numeric key [a] is depressed, a binary signal representative of a decimal number $a$ fed from the encoder matrix 2 through the AND gate G1 can be fed to the register 5 through a full adder 4. As a key [X] is subsequently depressed, a signal $g6$ is impressed upon a gate G6 from a control circuit (not shown) to open the gate G6. The content "20" of the register 8 is added $a$ times to the content of the register 5, by the full adder 4, and the result of the arithmetic operation $(20 \times a)$ can be stored in the register 6 through the AND gate G2 and, thereafter, transferred to the register 5 through the AND gate G8, whereby the arithmetic result X of (A) is finally displayed on the indicia display section 7. In this case, the constant "20" is memorized in the register 8.

In a similar manner, to obtain the result Y of (B), when the key [b] is depressed, the binary signal representative of the decimal number $b$ can be fed to the register 5 through the AND gate G1 from the encoder matrix 2. The key [X] is then depressed, and the arithmetic result of $(b \times 20)$ can be stored in the register 5 which is finally displayed in the same way as described above.

According to the present invention, the same may apply to division, addition and subtraction to be performed between the constant number and a series of arbitrary numbers. In such a case, the operator of the calculator must operate a key [÷], [+] or [−], respectively, instead of the key [×] which has been, in the foregoing instance, operated, to effect the multiplication between the constant number "20" and a series of the decimal numbers $a$, $b$ and $c$.

In addition, according to the present invention, an arithmetic operation utilizing the $n$-th power of $a$, where $n$ is an integer, either negative or positive, can be performed in a simplified procedure. This is an additional advantage obtainable from the system shown in the accompanying drawing. To perform this arithmetic operation subject to, for example, $(a \times a \times a \times a)$ or $a^4$, it is necessary to operate the keys in the order of, [a], [K], [×], [×], and [×].

By way of example, one first depresses the key [a] and then depresses the key [K], and the digit $a$ can be transferred to and stored in the register 8 in the same manner substantially as hereinbefore described. While in this condition, if the key [×] is subsquently depressed, the multiplication $(a \times a)$ can be carried out, the result $a^2$ of which is displayed on the indicia display section 7 while concurrently transferred to and stored in the register 5. If the key ⊠ is additionally depressed, the content of the register 5 which is $a^2$ can be multiplied by $a$ in a similar manner as hereinbefore described to give the result of multiplication ($a \times a \times a$) that is $a^3$, while said result of multiplication ($a \times a \times a$) can be transferred from the register 6 to the register 5 and stored in the latter. If the key ⊠ is finally depressed, the content of the register 5 which represents the result $a^3$ can be multiplied by the content $a$ of the register 8, the result $a^4$ of which is transferred from the register 6 to the register 5 which is in turn displayed on the indicia display section 7.

Of course, in the case where an arithmetic operation is to be performed with the use of the $n$-th power of $a$ wherein $n$ is a negative integer, that is, $a^{-4}$, the key ⊟÷ should be operated instead of the key ⊠.

On the contrary thereto, according to the conventional electronic calculator, the keys [a] and ⊠ should be alternately operated to obtain the result of multiplication having an exponent of $n$. Even in the case where the conventional calculator is provided with the key [K], the operational procedure follows in the order of [a], [+], [×], [K], [×], [K], [×] and [K].

Although the present invention has been fully disclosed in connection with the preferred embodiment thereof, it is to be noted that various changes and modifications are apparent to those skilled in the art. For example, although the equal key [=] and the addition or subtraction key [+] or [−] have been described as individually employed, the present invention can be applied where either of them is concurrently used with the other, such as represented by the key [±]. In addition, although the description has proceeded in connection with the electronic calculator having the constant calculation key which can be locked in the depressed condition, the constant calculation key of automatic return type may be used. In this case, an additional storing element is necessary for storing a signal indicative of the operation of said constant calculation key, the content of the additional storing element being cleared by a suitable signal to be generated upon completion of the desired constant calculation.

What we claim is:

1. An arithmetic system for use in an electronic calculator including a keyboard provided with a plurality of numerical keys representing decimal digits zero through nine and a plurality of function keys including a constant calculation key and a clear key, said system comprising:

first storing means for storing input signals fed from a suitable source, the contents of said first storing means being cleared from said first storing means only when said clear key is operated;

second storing means for storing the contents of said first storing means, which has been transferred thereto, during a period in which a signal indicative of the depression of said constant calculation key is generated;

gating means having one input terminal adapted to receive an output signal from said first storing means and another input terminal adapted to receive a signal from said keyboard representative of the depression of said constant calculation key, whereby said gating means can be triggered on for a certain period of time in response to the signal representative of the depression of said constant calculation key, to thereby permit the transfer of the contents of said first storing means to said second storing means; and arithmetic means for effecting an arithmetic operation in response to the contents of said first and second storing means, the output of said arithmetic means being connected to said first storing means for storing therein the result of said arithmetic operation.

2. An arithmetic system for use in an electronic calculator including a keyboard provided with a plurality of numerical keys representing decimal digits zero through nine and a plurality of function keys including a constant calculation key and a clear key, said system comprising:

first storing means for storing input signal fed thereto;

first gating means disposed between an output and input of said first storing means for permitting the circulation of the content of said first storing means;

second storing means for storing the contents of said first storing means when said contents of said first storing means have been transferred thereto;

second gating means having one input terminal adapted to receive an output signal from said first storing means and another input terminal adapted to receive a signal from said keyboard representative of the depression of said constant calculation key, whereby said second gating means can be triggered on for a certain period in response to the signal representative of the depression of said constant calculation key, to thereby permit the transfer of the contents of said first storing means to said second storing means;

third gating means disposed between an output and input of said second storing means for permitting the circulation of the contents of said second storing means during a period in which a signal indicative of the depression of said constant calculation key is generated; and arithmetic means for effecting an arithmetic operation in response to the contents of said first and second storing means, the output of said arithmetic means being connected to said first storing means for storing therein the result of said arithmetic operation.

3. In an electronic calculator including a keyboard provided with a plurality of numerical keys representing predetermined arithmetic digits and a plurality of functional keys, an arithmetic system for carrying out calculations in which a number may be repeatedly employed in calculations, comprising:

an arithmetic unit for carrying out an arithmetic operation in response to instructional signals supplied by the depression of numerical and functional keys on said keyboard;

first means, responsive to the depression of a predetermined one of said functional keys, for storing input signals representative of a number;

second means, responsive to the depression of a functional key on said keyboard, for supplying the contents of said first means to said arithmetic unit for carrying out a calculation employing a number represented by signals stored in said first means;

third means, responsive to the operation of said arithmetic unit, for storing signals representative of the operation of said arithmetic unit; and first gating means, connected between the output of said third means and the input of said first means, for enabling the transfer of the contents of said third means to said first means.

4. An arithmetic system according to claim 3, further including fourth means, coupled to the output of said third means, for storing the contents thereof irrespective of the storage of the contents thereof by said first means.

5. An arithmetic system according to claim 3, further including second gating means connected between the output and input of said first means, for enabling the recirculation of the contents thereof.

6. An arithmetic system according to claim 4, further including third and fourth gating means connected to the input of said arithmetic unit and responsive to the output of said third and fourth means for supplying the signals stored therein to said arithmetic unit.

7. An arithmetic system according to claim 6, further including a encoder unit, coupled to the output of said numerical keys on said keyboard, for connecting the signals generated by the depression of said numerical keys into digital signals, to be gateably coupled to said arithmetic unit through an arithmetic input gate.

8. An arithmetic system according to claim 7, wherein said arithmetic unit comprises a full adder circuit and wherein each of said first, third and fourth means comprises a shift register capable of storing signals representing the output of said full adder circuit.

9. An arithmetic system according to claim 8, further including a circuit for generating a pulse having a duration at least equal to one word period connected between the predetermined one of said functional keys and said first gating means, for gating the contents of said third means to said first means.

10. An arithmetic system according to claim 6, wherein said third and fourth gating means include a terminal for receiving a clear signal for clearing the contents of said third and fourth means.

11. An arithmetic system according to claim 3, further including means for displaying the contents of said third means, so as to indicate the result of an operation of said arithmetic unit.

12. An arithmetic system according to claim 3, further including a circuit for generating a pulse having a duration at least equal to one word period connected between the predetermined one of said functional keys and said first gating means, for gating the contents of said third means to said first means.

13. An arithmetic system according to claim 12, wherein said third and fourth gating means include a terminal for receiving a clear signal for clearing the contents of said third and fourth means.

* * * * *